(12) United States Patent
Hannuksela et al.

(10) Patent No.: US 10,291,561 B2
(45) Date of Patent: May 14, 2019

(54) APPARATUS, A METHOD AND A COMPUTER PROGRAM FOR IMAGE CODING AND DECODING

(71) Applicant: Nokia Technologies Oy, Espoo (FI)

(72) Inventors: Miska Matias Hannuksela, Tampere (FI); Vinod Kumar Malamal Vadakital, Tampere (FI); Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1086 days.

(21) Appl. No.: 14/617,266

(22) Filed: Feb. 9, 2015

(65) Prior Publication Data
US 2016/0234144 A1 Aug. 11, 2016

(51) Int. Cl.
*H04N 19/00* (2014.01)
*H04L 12/58* (2006.01)
*H04N 19/30* (2014.01)
*H04N 19/61* (2014.01)

(52) U.S. Cl.
CPC ............ *H04L 51/063* (2013.01); *H04L 51/10* (2013.01); *H04N 19/00* (2013.01); *H04N 19/30* (2014.11); *H04N 19/61* (2014.11)

(58) Field of Classification Search
CPC ....................................................... G06F 8/61
USPC ......................................... 375/240.1–240.29
See application file for complete search history.

(56) References Cited

U.S. PATENT DOCUMENTS

| 8,949,737 B2* | 2/2015 | Hughes ..................... G06F 8/61 715/748 |
| 9,800,893 B2 | 10/2017 | Lainema et al. |
| 2006/0184532 A1 | 8/2006 | Hamada et al. |
| 2012/0066708 A1 | 3/2012 | Lee et al. |
| 2014/0010521 A1 | 1/2014 | Harada et al. |
| 2014/0314148 A1 | 10/2014 | Lainema et al. |

FOREIGN PATENT DOCUMENTS

| JP | 5569830 B2 | 8/2014 |
| KR | 2005-0098875 A | 10/2005 |
| KR | 2012-0026695 A | 3/2012 |
| WO | 2005/086625 A2 | 9/2005 |

OTHER PUBLICATIONS

Gellens et al.,"The Codecs and Profiles Parameters for Bucket Media Types", RFC 6381, Internet Engineering Task Force, Aug. 2011, pp. 1-19.
"Information Technology—Coding of Audio-Visual Objects—Part 15: Advanced Video Coding (AVC) File Format", ISO/IEC 14496-15, First edition, Apr. 15, 2004, 29 pages.
(Continued)

*Primary Examiner* — Anand S Rao
(74) *Attorney, Agent, or Firm* — Alston & Bird LLP

(57) ABSTRACT

A method comprising: receiving a first description of a first file, the first description including properties of at least a derived image included in or referred to by the first file; determining, based on the properties of the derived image, whether to obtain the derived image; and in response to determining to obtain the derived image, obtaining the first file comprising the derived image.

13 Claims, 6 Drawing Sheets

(56) References Cited

OTHER PUBLICATIONS

"Advanced Video Coding for Generic Audiovisual Services", Series H: Audiovisual and Multimedia Systems, Infrastructure of audiovisual services—Coding of moving video, Recommendation ITU-T H.264, Mar. 2010, 676 pages.
"High Efficiency Video Coding", Series H: Audiovisual and Multimedia Systems, Infrastructure of audiovisual services—Coding of moving video, Recommendation ITU-T H.265, Apr. 2013, 317 pages.
"Information Technology—Coding of Audio-Visual Objects—Part 12: ISO Base Media File Format", ISO/IEC 14496-12, Third edition, Oct. 15, 2008, 120 pages.
"Information Technology—Coding of Audio-Visual Objects—Part 14: MP4 File Format", ISO/IEC14496-14, First edition, Nov. 15, 2003, 18 pages.
Schulzrinne et al.,"RTP: A Transport Protocol for Real-Time Applications", RFC 3550, Network Working Group, Jul. 2003, 92 pages.
"Information technology—Generic Coding of Moving Pictures and Associated Audio Information: Systems", Series H: Audiovisual and Multimedia Systems, Infrastructure of audiovisual services—Transmission multiplexing and synchronization, ITU-T Recommendation H.222.0, Feb. 2000, 171 pages.
"3rd Generation Partnership Project; Technical Specification Group Services and System Aspects; Transparent end-to-end packet switched streaming service (PSS); 3GPP file format (3GP)(Release 13)", 3GPP TS 26.244, V13.0.0., Dec. 2014, 64 pages.
"Information technology—Dynamic Adaptive Streaming Over HTTP (DASH)", Part 1: Media presentation description and segment formats, ISO/IEC 23009-1, May 15, 2014, 8 pages.
"Information technology—MPEG systems technologies—Part 12: Image File Format", ISO/IEC JTC/SC 29N, Apr. 30, 2013, ISO/IEC CD 23008-12 1st Edition, 55 pages.
International Search Report and Written Opinion received for corresponding Patent Cooperation Treaty Application No. PCT/FI2016/050063, dated May 10, 2016, 14 pages.

Sjoberg et al., "Overview of Hevc High-Level Syntax and Reference Picture Management", IEEE Transactions on Circuits and Systems for Video Technology, vol. 22, No. 12, Dec. 2012, pp. 1858-1870.
Hannuksela et al., "The High Efficiency Image File Format Standard", IEEE Signal Processing Magazine, vol. 32, No. 4, Jul. 2015, pp. 150-156.
Hannuksela et al., "Overview of the High Efficiency Image File Format", Joint Collaborative Team on Video Coding (JCT-VC) of ITU-T SG 16 WP 3 and ISO/IEC JTC 1/SC 29/WG 11, JCTVC-V0072, Oct. 15-21, 2015,pp. 1-12.
Office action received for corresponding Korean Patent Application No. 2017-7025156, dated Apr. 11, 2018, 5 pages of office action and no page of translation available.
Office Action for Korean Application No. 2017-7025156 dated Oct. 23, 2018, 6 pages.
Office action received for corresponding Japanese Patent Application No. 2017-559922, dated Jun. 26, 2018, 9 pages of office action and 6 pages of translation available.
Hayase et al., "H.264/AVC Extended Standard SVC Compliant Full HDTV Video Transmission System", The Institute of Electronics, Information and Communication Engineers, vol. J93-D, No. 10, Oct. 1, 2010, 14 pages.
"Information technology—MPEG systems technologies—Part 6: Dynamic adaptive streaming over HTTP (DASH)", ISO/IEC JTC 1/SC 29/WG 11, ISO/IEC DIS 23001-6—STD Version 2.1, Jan. 28, 2011, 31 pages.
"Answer: Is playback compatibility of MPEG 4 OK?", Nikkei personal computer, No. 478, Mar. 28, 2005, 6 pages.
Extended European Search Report received for corresponding European Patent Application No. 16748774.3, dated Sep. 14, 2018, 7 pages.
"10 Important Nondestructive Editing Techniques for Photo Manipulators", Photoshoptutorials, Retrieved on Oct. 12, 2018, Webpage available at : https://www.photoshoptutorials.ws/photoshop-tutorials/photo-manipulation/10-important-nondestructive-editing-techniques-photo-manipulators/.
Office Action for Japanese Application No. 2017-559922 dated Jan. 25, 2019, 8 pages.

* cited by examiner

APPARATUS, A METHOD AND A COMPUTER PROGRAM FOR IMAGE CODING AND DECODING

TECHNICAL FIELD

The present invention relates to an apparatus, a method and a computer program for image coding and decoding.

BACKGROUND

The ISO base media file format (ISOBMFF) specifies a generic structure for the storage and transport of timed media such as audio, video, and teletext. Recently, work has been initiated towards extending ISOBMFF's capabilities to enable the handling of still images and image sequences also. To enable storage and transport of image sequences, the Image File Format has been defined in ISO/IEC 23008-12 also known as MPEG-H Part 12, the definition being based on the ISO base media file format.

Among other properties, the Image File Format supports derived images. An item is a derived image, when it includes a 'dimg' item reference to another item. A derived image is obtained by performing a specified operation, such as rotation, to specified input images. The operation performed to obtain the derived image is identified by the item_type of the item. The image items used as input to a derived image may be coded images or they may be other derived image items.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. In the absence of the parameters described here, it is necessary to examine each media element in order to determine the codecs or other features required to render the content.

The Image File Format specifies two MIME types, one for images and image collections, and another one for image sequences. The format of the codecs parameter is specified for these MIME types. However, the specification lacks the consideration for derived images, which may lead to various problems, such as the player consuming time for assessing if it is capable of composing the derived image before performing the operations.

SUMMARY

Now in order to at least alleviate the above problems, a method for assessing the capability to compose the derived image is presented herein.

A method according to a first aspect comprises
receiving a first description of a first file, the first description including properties of at least a derived image included in or referred to by the first file.
determining, based on the properties of the derived image, whether to obtain the derived image; and
in response to determining to obtain the derived image, obtaining the first file comprising the derived image.

According to an embodiment, the method further comprises:
receiving a second description of a second file that comprises representation of a corresponding image content as that represented by the derived image; and
determining, based on the properties of the derived image and the second description, whether to obtain the first file or the second file.

According to an embodiment, the first description comprises a MIME type.

According to an embodiment, the first description, such as the MIME type, comprises one or more of the following pieces of information for at least one derived image:
a first identification of an instruction set used for the at least one derived image;
a second identification of the codecs and codec profiles of coded input images for the at least one derived image;
a resource count indicative of resources needed for the construction of the at least one derived image.

According to an embodiment, the method further comprises:
parsing, from the first file, at least one value indicative of the needed resources of composing a derived picture; and
determining, based on at least one value, if the derived picture can be composed.

A second aspect relates to an apparatus comprising
at least one processor and at least one memory, said at least one memory stored with code thereon, which when executed by said at least one processor, causes the apparatus to perform at least
receiving a first description of a first file, the first description including properties of at least a derived image included in or referred to by the first file.
determining, based on the properties of the derived image, whether to obtain the derived image; and
in response to determining to obtain the derived image, obtaining the first file comprising the derived image.

According to a third aspect, there is provided a method comprising:
obtaining one or more input images;
determining at least one operation to be performed on at least one input for obtaining a derived image; and
including a first description of a first file into a media content description, the first description including properties of at least the derived image included in or referred to by the first file.

According to an embodiment, the method further comprises
including a second description of a second file that comprises representation of a corresponding image content as that represented by the derived image.

According to an embodiment, the first description comprises a Multipurpose Internet Mail Extension (MIME) type.

According to an embodiment, the first description, such as the MIME type, comprises one or more of the following pieces of information for at least one derived image:
a first identification of an instruction set used for the at least one derived image;
a second identification of the codecs and codec profiles of coded input images for the at least one derived image;
a resource count indicative of resources needed for the construction of the at least one derived image.

According to an embodiment, the method further comprises:
including, into the first file, a data structure that represents a derived image and including, into the first file, at least one value indicative of the needed resources of composing a derived picture.

According to an embodiment, the values indicative of the needed resources includes one or more of the following:

A value greater than or equal to a maximum pixel, sample and/or byte count needed at any stage of composing the derived picture;

A value greater than or equal to a maximum pixel, sample and/or byte count needed for any picture needed to compose the derived picture, wherein the pictures needed to compose the derived picture include output pictures of intermediate operations for composing the derived picture;

An identifier for identifying the set of operation types that may be used in composing the derived picture, whereas operation types not included in the set of operation types are not used in composing the derived picture.

A fourth aspect relates to an apparatus comprising at least one processor and at least one memory, said at least one memory stored with code thereon, which when executed by said at least one processor, causes the apparatus to perform at least obtaining one or more input images;

determining at least one operation to be performed on at least one input for obtaining a derived image; and including a first description of a first file into a media content description, the first description including properties of at least the derived image included in or referred to by the first file.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
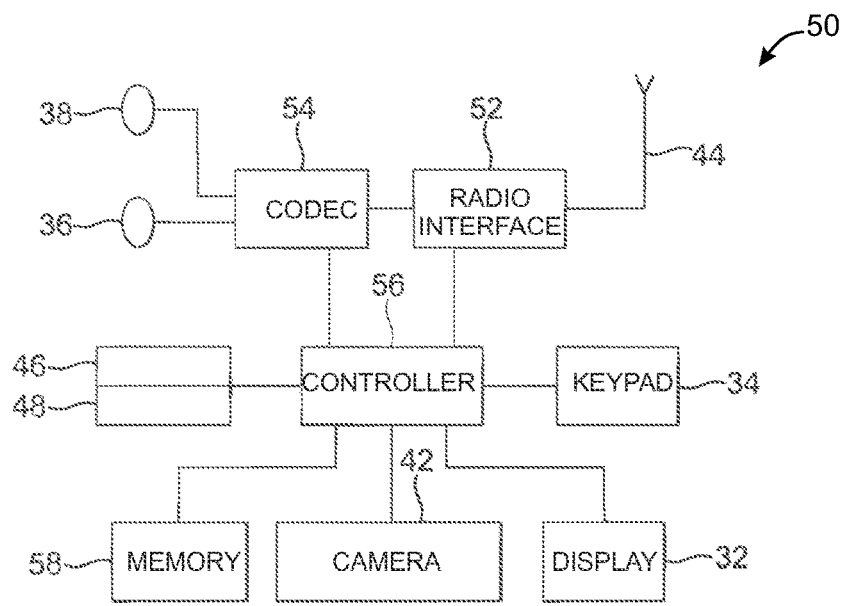
FIG. 1 shows schematically an electronic device employing embodiments of the invention.
Figure 2:
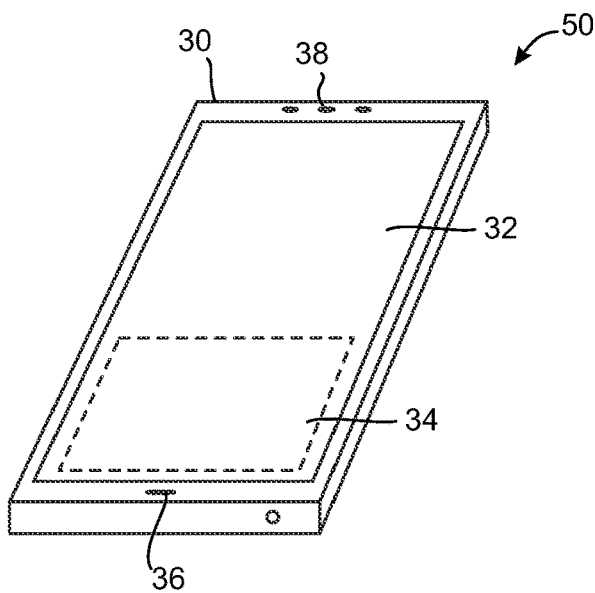
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding.

Figure 3:
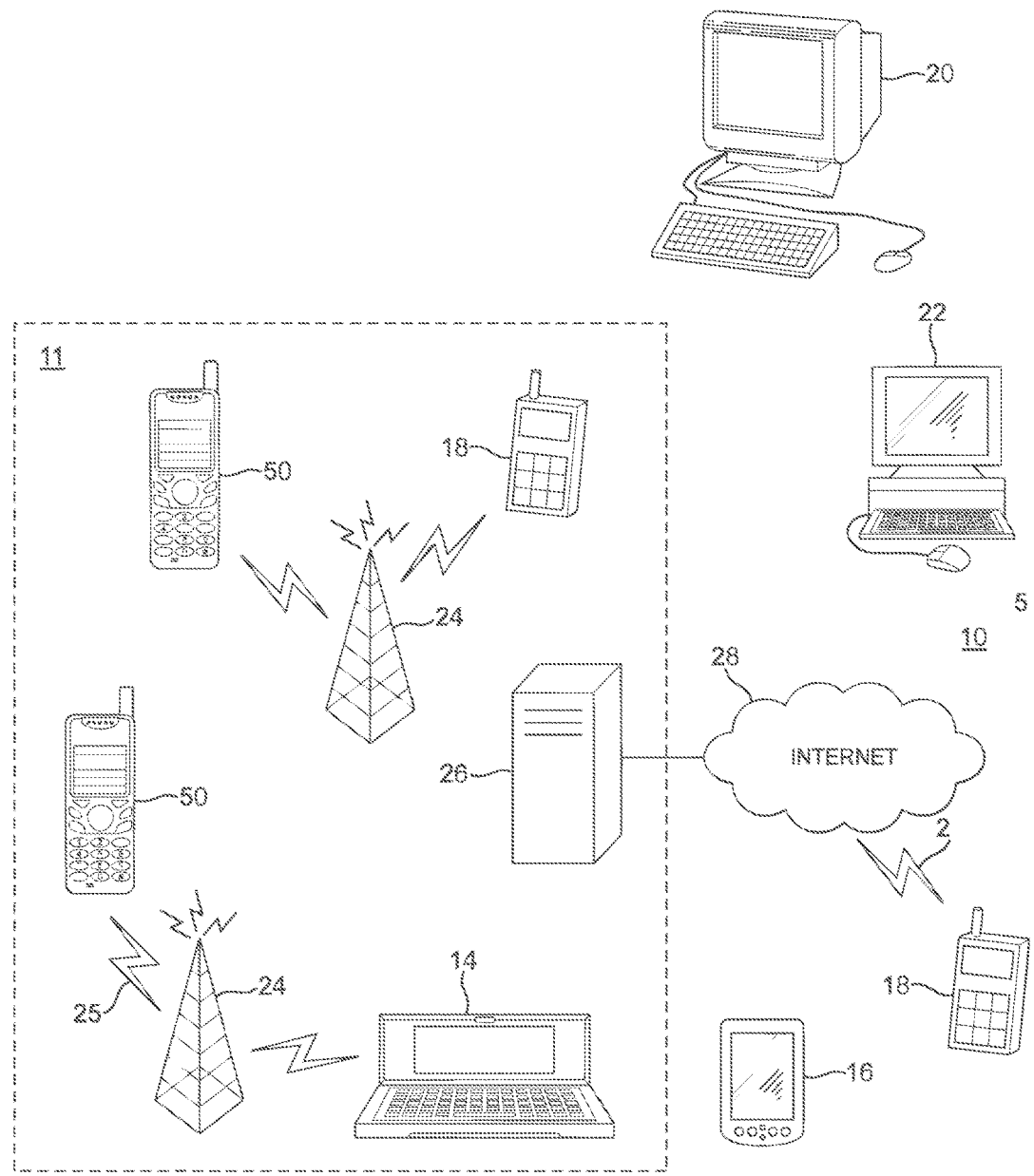
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver may group packets by synchronization source for playback. Examples of synchronization sources include the sender of a stream of packets derived from a signal source such as a microphone or a camera, or an RTP mixer. Each RTP stream is identified by a SSRC that is unique within the RTP session. An RTP stream may be regarded as a logical channel.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate). A video encoder may be used to encode an image sequence, as defined subsequently, and a video decoder may be used to decode a coded image sequence. A video encoder or an intra coding part of a video encoder or an image encoder may be used to encode an image, and a video decoder or an inter decoding part of a video decoder or an image decoder may be used to decode a coded image.

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
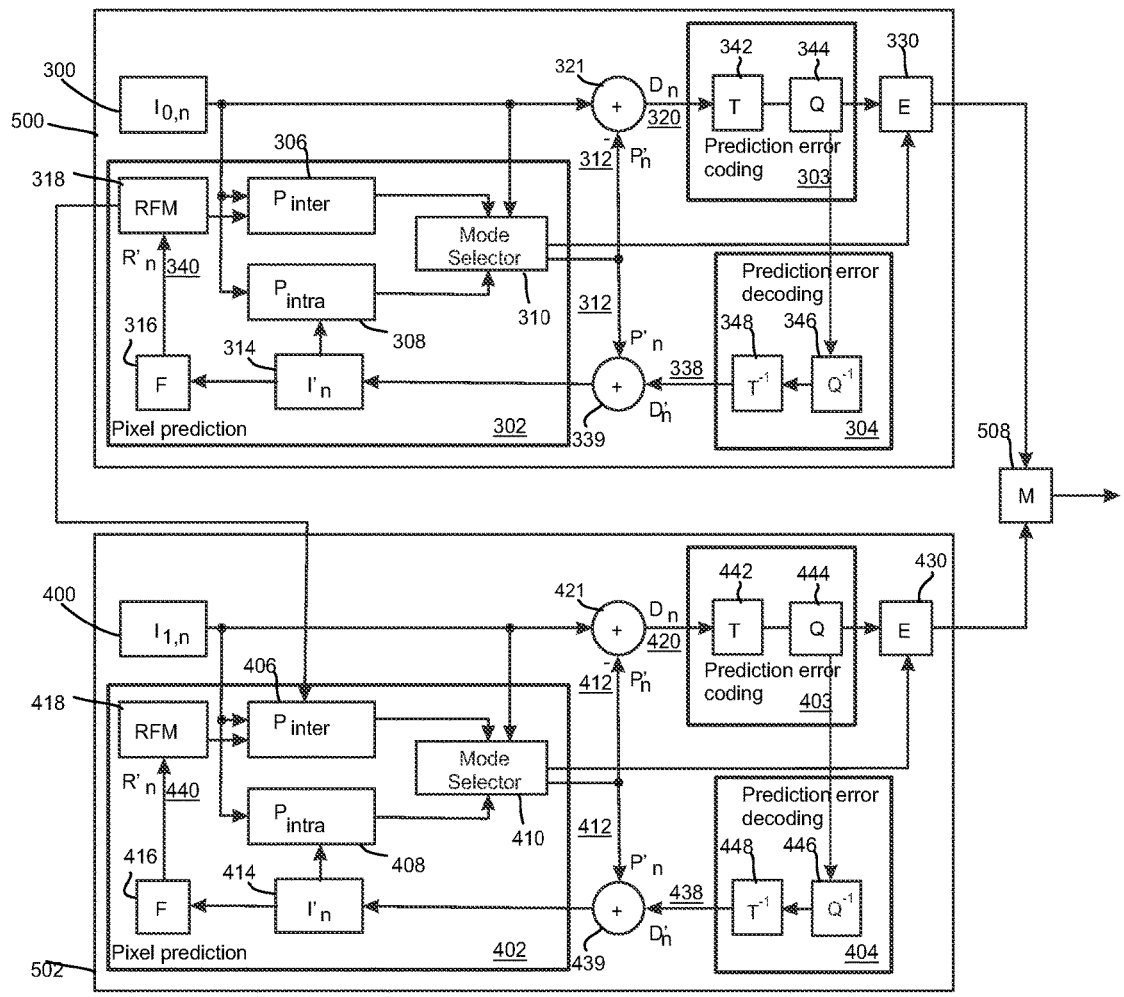
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly simplified to encode only one layer or extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/ HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Version 2 of H.265/HEVC included scalable, multiview, and fidelity range extensions, which may be abbreviated SHVC, MV-HEVC, and REXT, respectively. Version 2 of H.265/HEVC was pre-published as ITU-T Recommendation H.265 (October 2014) and is likely to be published as Edition 2 of ISO/IEC 23008-2 in 2015. There are currently ongoing standardization projects to develop further extensions to H.265/HEVC, including three-dimensional and screen content coding extensions, which may be abbreviated 3D-HEVC and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order. In the description of existing standards as well as in the description of example embodiments, a phrase "by external means" or "through external means" may be used. For example, an entity, such as a syntax structure or a value of a variable used in the decoding process, may be provided "by external means" to the decoding process. The phrase "by external means" may indicate that the entity is not included in the bitstream created by the encoder, but rather conveyed externally from the bitstream for example using a control protocol. It may alternatively or additionally mean that the entity is not created by the encoder, but may be created for example in the player or decoding control logic or alike that is using the decoder. The decoder may have an interface for inputting the external means, such as variable values.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles. A tier may be defined as specified category of level constraints imposed on values of the syntax elements in the bitstream, where the level constraints are nested within a tier and a decoder conforming to a certain tier and level would be capable of decoding all bitstreams that conform to the same tier or the lower tier of that level or any level below it.

In some cases, a conformance point may be defined as a combination of a particular profile and a particular level or a combination of a particular profile, a particular tier, and a particular level. It needs to be understood that a conformance point may be defined in alternative ways, while its intent to specify characteristics and limits of bitstream and/or characteristics and (maximum) resources of decoders may be kept unchanged.

The elementary unit for the input to an H.264/AVC or HEVC encoder and the output of an H.264/AVC or HEVC decoder, respectively, is a picture. A picture given as an input to an encoder may also referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

Typical video codecs enable the use of uni-prediction, where a single prediction block is used for a block being (de)coded, and bi-prediction, where two prediction blocks are combined to form the prediction for a block being (de)coded. Some video codecs enable weighted prediction, where the sample values of the prediction blocks are weighted prior to adding residual information. For example, multiplicative weighting factor and an additive offset which can be applied. In explicit weighted prediction, enabled by some video codecs, a weighting factor and offset may be coded for example in the slice header for each allowable reference picture index. In implicit weighted prediction, enabled by some video codecs, the weighting factors and/or offsets are not coded but are derived e.g. based on the relative picture order count (POC) distances of the reference pictures.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, VCL NAL units contain syntax elements representing one or more CU.

In H.264/AVC, a coded slice NAL unit can be indicated to be a coded slice in an Instantaneous Decoding Refresh (IDR) picture or coded slice in a non-IDR picture.

In HEVC, a coded slice NAL unit can be indicated to be one of the following types:

| nal_unit_type | Name of nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |
| 2, 3 | TSA_N, TSA_R | Coded slice segment of a TSA picture slice_segment_layer_rbsp( ) |
| 4, 5 | STSA_N, STSA_R | Coded slice segment of an STSA picture slice_layer_rbsp( ) |
| 6, 7 | RADL_N, RADL_R | Coded slice segment of a RADL picture slice_layer_rbsp( ) |
| 8, 9 | RASL_N, RASL_R, | Coded slice segment of a RASL picture slice_layer_rbsp( ) |
| 10, 12, 14 | RSV_VCL_N10 RSV_VCL_N12 RSV_VCL_N14 | Reserved // reserved non-RAP non-reference VCL NAL unit types |
| 11, 13, 15 | RSV_VCL_R11 RSV_VCL_R13 RSV_VCL_R15 | Reserved // reserved non-RAP reference VCL NAL unit types |
| 16, 17, 18 | BLA_W_LP BLA_W_DLP (a.k.a. BLA_W_RADL) BLA_N_LP | Coded slice segment of a BLA picture slice_segment_layer_rbsp( ) |
| 19, 20 | IDR_W_DLP (a.k.a. IDR_W_RADL) IDR_N_LP | Coded slice segment of an IDR picture slice_segment_layer_rbsp( ) |
| 21 | CRA_NUT | Coded slice segment of a CRA picture slice_segment_layer_rbsp( ) |
| 22, 23 | RSV_IRAP_VCL22.. RSV_IRAP_VCL23 | Reserved // reserved RAP VCL NAL unit types |
| 24 ... 31 | RSV_VCL24.. RSV_VCL31 | Reserved // reserved non-RAP VCL NAL unit types |

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture, is a picture where each slice or slice segment has nal_unit_type in the range of 16 to 23, inclusive. A IRAP picture in an independent layer contains only intra-coded slices. An IRAP picture belonging to a predicted layer with nuh_layer_id value currLayerId may contain P, B, and I slices, cannot use inter prediction from other pictures with nuh_layer_id equal to currLayerId, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an TRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer with nuh_layer_id value currLayerId and all subsequent non-RASL pictures with nuh_layer_id equal to currLayerId in decoding order can be correctly decoded without performing the decoding process of any pictures with nuh_layer_id equal to currLayerId that precede the IRAP picture in decoding order, when the necessary parameter sets are available when they need to be activated and when the decoding of each direct reference layer of the layer with nuh_layer_id equal to currLayerId has been initialized (i.e. when LayerInitializedFlag[refLayerId] is equal to 1 for refLayerId equal to all nuh_layer_id values of the direct reference layers of the layer with nuh_layer_id equal to currLayerId). There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporaIId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present. In HEVC, the base VPS may be considered to comprise the video_parameter_set_rbsp( ) syntax structure without the vps_extension( ) syntax structure. The video_parameter_set_rbsp( ) syntax structure was primarily specified already for HEVC version 1 and includes syntax elements which may be of use for base layer decoding. In HEVC, the VPS extension may be considered to comprise the vps_extension( ) syntax structure. The vps_extension( ) syntax structure was specified in HEVC version 2 primarily for multi-layer extensions and comprises syntax elements which may be of use for decoding of one or more non-base layers, such as syntax elements indicating layer dependency relations.

H.264/AVC and HEVC syntax allows many instances of parameter sets, and each instance is identified with a unique identifier. In order to limit the memory usage needed for parameter sets, the value range for parameter set identifiers has been limited. In H.264/AVC and HEVC, each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In HEVC, no redundant coded picture has been specified.

In H.264/AVC, an access unit (AU) comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units.

It may be required that coded pictures appear in certain order within an access unit. For example a coded picture with nuh_layer_id equal to nuhLayerIdA may be required to precede, in decoding order, all coded pictures with nuh_layer_id greater than nuhLayerIdA in the same access unit.

In HEVC, a picture unit may be defined as a set of NAL units that contain all VCL NAL units of a coded picture and their associated non-VCL NAL units. An associated VCL NAL unit for a non-VCL NAL unit may be defined as the preceding VCL NAL unit, in decoding order, of the non-VCL NAL unit for certain types of non-VCL NAL units and the next VCL NAL unit, in decoding order, of the non-VCL NAL unit for other types of non-VCL NAL units. An associated non-VCL NAL unit for a VCL NAL unit may be defined to be the a non-VCL NAL unit for which the VCL NAL unit is the associated VCL NAL unit. For example, in HEVC, an associated VCL NAL unit may be defined as the preceding VCL NAL unit in decoding order for a non-VCL NAL unit with nal_unit_type equal to EOS_NUT, EOB_NUT, FD_NUT, or SUFFIX_SEI_NUT, or in the ranges of RSV_NVCL45 . . . RSV_NVCL47 or UNSPEC56 . . . UNSPEC63; or otherwise the next VCL NAL unit in decoding order.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. In multi-layer HEVC, the value of NoRaslOutputFlag is equal to 1 for each IRAP picture when its nuh_layer_id is such that LayerInitializedFlag[nuh_layer_id] is equal to 0 and LayerInitializedFlag[refLayerId] is equal to 1 for all values of refLayerId equal to IdDirectRefLayer[nuh_layer_id][j], where j is in the range of 0 to NumDirectRefLayers[nuh_layer_id]−1, inclusive. Otherwise, the value of NoRaslOutputFlag is equal to HandleCraAsBlaFlag. NoRaslOutputFlag equal to 1 has an impact that the RASL pictures associated with the TRAP picture for which the NoRaslOutputFlag is set are not output by the decoder. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

In HEVC, a coded video sequence group (CVSG) may be defined, for example, as one or more consecutive CVSs in decoding order that collectively consist of an TRAP access unit that activates a VPS RBSP firstVpsRbsp that was not already active followed by all subsequent access units, in decoding order, for which firstVpsRbsp is the active VPS RBSP up to the end of the bitstream or up to but excluding the access unit that activates a different VPS RBSP than firstVpsRbsp, whichever is earlier in decoding order.

A Structure of Pictures (SOP) may be defined as one or more coded pictures consecutive in decoding order, in which the first coded picture in decoding order is a reference picture at the lowest temporal sub-layer and no coded picture except potentially the first coded picture in decoding order is a RAP picture. All pictures in the previous SOP precede in decoding order all pictures in the current SOP and all pictures in the next SOP succeed in decoding order all pictures in the current SOP. A SOP may represent a hierarchical and repetitive inter prediction structure. The term group of pictures (GOP) may sometimes be used interchangeably with the term SOP and having the same semantics as the semantics of SOP.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

ISO/IEC International Standard 23009-1 specifies dynamic adaptive streaming over HTTP (DASH). Some concepts, formats, and operations of MPEG-DASH are described below as an example of a video streaming system, wherein the embodiments may be implemented. The aspects of the invention are not limited to MPEG-DASH, but rather the description is given for one possible basis on top of which the invention may be partly or fully realized.

In dynamic adaptive streaming over HTTP (DASH), the multimedia content may be captured and stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Figure 6:
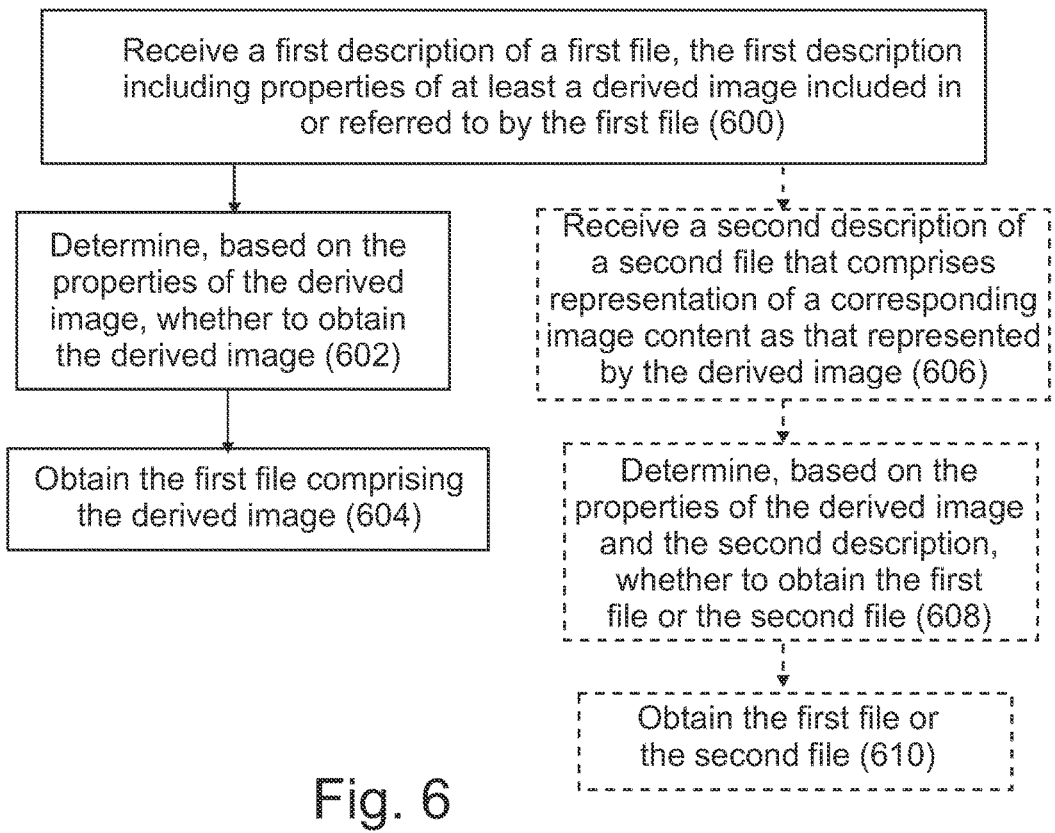
FIG. 6 shows a flow chart of operation of a media player according to an embodiment of the invention.

The media presentation description (MPD) may provide information for clients to establish a dynamic adaptive streaming over HTTP. MPD may contain information describing media presentation, such as an HTTP-uniform resource locator (URL) of each Segment to make GET Segment request. In DASH, hierarchical data model may be used to structure media presentation as shown in FIG. 6. A media presentation may comprise a sequence of one or more Periods, each Period may contain one or more Groups, each Group may contain one or more Adaptation Sets, each Adaptation Set may contain one or more Representations, and each Representation may comprise one or more Segments. A Representation is one of the alternative choices of the media content or a subset thereof which may differ by the encoding choice, e.g. by bitrate, resolution, language, codec, etc. The Segment may contain certain duration of media data, and metadata to decode and present the included media content. A Segment may be identified by a uniform resource indicator (URI) and can be requested by a HTTP GET request. A Segment may be defined as a unit of data associated with an HTTP-URL and optionally a byte range that are specified by an MPD.

Streaming systems similar to MPEG-DASH include for example HTTP Live Streaming (a.k.a. HLS), specified in the IETF Internet Draft draft-pantos-http-live-streaming-13 (and other versions of the same Internet Draft). As a manifest format corresponding to the MPD, HLS uses an extended M3U format. M3U is a file format for multimedia playlists, originally developed for audio files. An M3U Playlist is a text file that consists of individual lines, and each line is a URI, blank, or starts with the character '#' indicating a tag or a comment. A URI line identifies a media segment or a Playlist file. Tags begin with #EXT. The HLS specification specifies a number of tags, which may be regarded as key-value pairs. The value part of tags may comprise an attribute list, which is a comma-separated list of attribute-value pairs, where an attribute-value pair may be considered to have the syntax AttributeName=AttributeValue. Hence, tags of HLS M3U8 files may be considered similar to Elements in MPD or XML, and attributes of HLS M3U8 files may be considered similar to Attributes in MPD or XML. Media segments in HLS are formatted according to the MPEG-2 Transport Stream and contain a single MPEG-2 Program. Each media segment is recommended to start with a Program Association Table (PAT) and a Program Map Table (PMT).

A container file may contain content, such as media data, and metadata related to the content. A container file may be used to identify and interleave different data types. A multimedia container file may for example contain audio, video and images. A multimedia container file may be used as an element used in the chain of multimedia content production, manipulation, transmission and consumption. There may be substantial differences between a coding format (also known as an elementary stream format or a bitstream format) and a container file format. The coding format may relate to the action of a specific coding or compression algorithm that codes the content information into a bitstream. The container file format (which may also be referred as a media file format) may specify syntax and semantics for organizing the generated bitstream or bitstreams in such way that it can e.g. be accessed for local decoding and playback, transferred as a file, or streamed, all utilizing a variety of storage and transport architectures. Furthermore, the file format may facilitate interchange and editing of the media as well as recording of received real-time streams to a file.

Available media file format standards include ISO base media file format (ISO/IEC 14496-12, which may be abbreviated ISOBMFF) as well as standards derived from the ISOBMFF, such as MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISO/IEC 14496-15 specifies the storage of bitstreams of H.264/AVC and/or HEVC and/or their extensions in ISOBMFF compliant files. The mentioned file formats (including the ISO file format itself) as well as other file formats derived from the ISOBMFF may be called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

Figure 5:
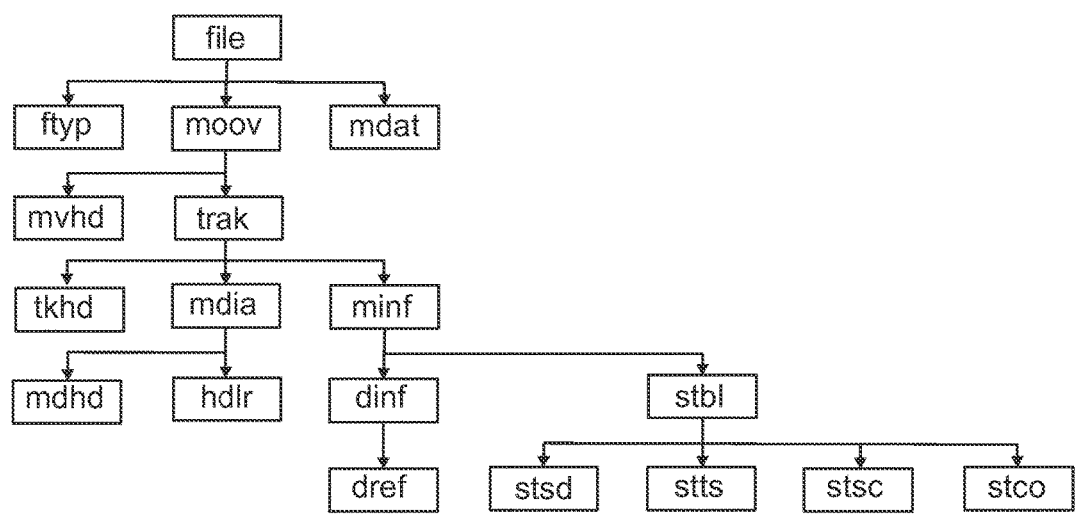
FIG. 5 shows an example of ISOBMFF box structures.

According to the ISO family of file formats, a file includes media data and metadata that are encapsulated into boxes. Each box may be identified by a four character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box. An example containment hierarchy of ISOBMFF box structures is shown in FIG. 5.

According to the ISO family of file formats, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. The data for each track may be considered to be a logical channel. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected. Samples of a track may be implicitly associated with sample numbers that may be incremented e.g. by 1 in the indicated decoding order of samples. The first sample in a track may be associated with sample number 1.

An example of a simplified file structure according to the ISO base media file format may be described as follows. The file may include the 'moov' box and the 'mdat' box and the 'moov' box may include one or more tracks that correspond to video and audio, respectively.

Many files formatted according to the ISO base media file format start with a file type box, also referred to as the ftyp box. The ftyp box contains information of the brands labeling the file. The ftyp box includes one major brand indication and a list of compatible brands. The major brand identifies the most suitable file format specification to be used for parsing the file. The compatible brands indicate which file format specifications and/or conformance points the file conforms to. It is possible that a file is conformant to multiple specifications. All brands indicating compatibility to these specifications should be listed, so that a reader only understanding a subset of the compatible brands can get an indication that the file can be parsed. Compatible brands also give a permission for a file parser of a particular file format specification to process a file containing the same particular file format brand in the ftyp box. A file player may check if the ftyp box of a file comprises brands it supports, and may parse and play the file only if any file format specification supported by the file player is listed among the compatible brands.

Files conforming to the ISOBMFF may contain any non-timed objects, referred to as items, meta items, or metadata items, in a meta box (fourCC: 'meta'). While the name of the meta box refers to metadata, items can generally contain metadata or media data. The meta box may reside at the top level of the file, within a movie box (fourCC: 'moov'), and within a track box (fourCC: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (fourCC: 'dinf'). In the specific case that the metadata is formatted using XML syntax and is required to be stored directly in the MetaBox, the metadata may be encapsulated into either the XMLBox (fourCC: 'xml') or the BinaryXMLBox (fourcc: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

In order to support more than one meta box at any level of the hierarchy (file, movie, or track), a meta box container box ('meco') may be used as one ISO base media file format. The meta box container box may carry any number of additional meta boxes at any level of the hierarchy (file, movie, or track). This may allow that e.g. the same metadata is being presented in two different, alternative metadata systems. The meta box relation box ('mere') may enable describing how different meta boxes relate to each other, e.g. whether they contain exactly the same metadata (but described with different schemes) or if one represents a superset of another one.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description 'stsd' box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference 'dref' box, also included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used when recording content to ISO files in order to avoid losing data if a recording application crashes, runs out of memory space, or some other incident occurs. Without movie fragments, data loss may occur because the file format may typically require that all metadata, e.g., the movie box, be written in one contiguous area of the file. Furthermore, when recording a file, there may not be sufficient amount of memory space (e.g., RAM) to buffer a movie box for the size of the storage available, and re-computing the contents of a movie box when the movie is closed may be too slow. Moreover, movie fragments may enable simultaneous recording and playback of a file using a regular ISO file parser. Finally, a smaller duration of initial buffering may be required for progressive downloading, e.g., simultaneous reception and playback of a file, when movie fragments are used and the initial movie box is smaller compared to a file with the same media content but structured without movie fragments.

The movie fragment feature may enable splitting the metadata that conventionally would reside in the movie box into multiple pieces. Each piece may correspond to a certain period of time for a track. In other words, the movie fragment feature may enable interleaving file metadata and media data. Consequently, the size of the movie box may be limited and the use cases mentioned above be realized.

In some examples, the media samples for the movie fragments may reside in an mdat box, as usual, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. Sample groupings are represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These are distinguished by a type field used to indicate the type of grouping.

The sample group boxes (SampleGroupDescription Box and SampleToGroup Box) reside within the sample table (stbl) box, which is enclosed in the media information (minf), media (mdia), and track (trak) boxes (in that order) within a movie (moov) box. The SampleToGroup box is allowed to reside in a movie fragment. Hence, sample grouping can be done fragment by fragment.

URL fragment identifiers (which may also be referred to as URL forms) may be specified for a particular content type to access a part of the resource, such as a file, indicated by the base part of the URL (without the fragment identifier). URL fragment identifiers may be identified for example by a hash ('#') character within the URL. For the ISOBMFF, it may be specified that URL fragments "#X" refers to a track with track_ID equal to X, "#item_ID=" and "#item_name=" refer to file level meta box(es), "#/item_ID=" and "#/item_name=" refer to the meta box(es) in the Movie box, and "#track_ID=X/item_ID=" and "#track_ID=X/item_name=" refer to meta boxes in the track with track_ID equal to X, including the meta boxes potentially found in movie fragments.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Image sequences, which may also be referred to as image bursts, may be obtained with various means or may be used for various purposes, including but not limited to one or more of the following:

An image sequence may represent sequentially captured pictures, e.g. using burst photography or such.

An image sequence may represent a focal stack, an exposure stack, or such, where the camera may be considered to be held approximately stationary and the capturing parameters have differed between pictures of the image sequence.

An image sequence may represent a panorama where the camera has been panned (or such) and time- and/or translation-wise approximately equal distant pictures have been shot during the camera movement.

An image sequence may represent an animation or a cinemagraph. A cinemagraph may be defined as a still picture in which a minor and repeated movement occurs.

Image sequences can be compressed either as sequences of still pictures coded with spatial prediction means or inter pictures coded with spatial and temporal prediction means. Image sequences with random access and support for editing individual pictures have been traditionally enabled by representing the sequence as a series of independently coded intra pictures. Such formats include, for example, Motion JPEG, animated GIF and the Intra profiles of H.264.

If a sequence of images is represented as a series of still pictures, the coding efficiency is typically poor and the file size requirement for a high resolution sequence can become massive. In the case a sequence is coded as a video with temporal prediction, there are strict limitations on how the sequence needs to be decoded, how it can be played back and issues when user wants to edit some of the images in the sequence.

MPEG-H Image File Format (ISO/IEC 23008-12) is a derived specification of the ISO Base Media File Format (ISOBMFF). At the time of writing this patent application, ISO/IEC 23008-12 was a draft standard and hence it needs to be understood that the name and/or nickname of the standard may therefore change in the final version of the standard. Names such as ISO Image File Format (ISOIFF) and MPEG Image File Format have been considered. Within the standard specification itself (or otherwise when the context is clear), the name "the Image File Format" can be used to refer to ISO/IEC 23008-12.

Some concepts, structures, and specifications of MPEG-H Image File Format are described below as an example of a container file format, based on which the embodiments may be implemented. The aspects of the invention are not limited to MPEG-H Image File Format, but rather the description is given for one possible basis on top of which the invention may be partly or fully realized.

The formats defined in ISO/IEC 23008-12 enable the interchange, editing, and display of images coded using High Efficiency Video Coding (HEVC) or any other image or video codec, and the carriage of metadata associated with those images. The Image File Format builds on tools defined in the ISO Base Media File Format to define an interoperable storage format for single images, collections of images, and sequences of images. The Image File Format includes a structural brand that does not constrain the codec used to code images stored in the file and HEVC-based brands that require the use of the HEVC for the coded images.

The use of the HEVC video coder to encode still images is supported by the Image File Format to cover the storage of single images, and collections of independently coded images, as well as the storage of image sequences, with timing that is optionally used at the player and/or decoder, and in which the images may be dependent on other images.

A file conforming to the Image File Format may include both still images and image sequences, enabling a single file to be constructed to meet a variety of needs (e.g. a single image for printing, and a record of the image burst that was used to synthesize that image). In general, the still image support is used for cases such as when neither timing nor inter-picture coding dependency are required. If timing or other tools from the ISO Base Media File Format available for tracks are needed (e.g. a simple animated image), or pictures have been coded with inter-picture coding dependency, then an image sequence, stored as a track, may be used.

The Image File Format, similar to the ISOBMFF, uses an object oriented mechanism, where each object is called a box. All media data and its related metadata are encapsulated into boxes. Each box is identified by a four character code (4CC) and starts with a header which informs about the type and size of the box.

According to the MPEG-H Image File Format, still images are stored as items. It may be required that image items containing coded images are independently coded and do not depend on any other item in their decoding.

In the context of the MPEG-H Image File Format, the following boxes may be contained within the root-level 'meta' box and may be used as described in the following. In the MPEG-H image file format, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

The Image File Format supports derived images. An item is a derived image, when it includes a 'dimg' item reference to another item. A derived image is obtained by performing a specified operation (a.k.a image operation), such as rotation, to specified input images. The operation performed to obtain the derived image is identified by the item_type of the item. The image items used as input to a derived image may be coded images, e.g. with item type 'hvc1', or they may be other derived image items.

The Image File Format specification includes the specification of the clean aperture (i.e. cropping) operation (item_type equal to 'clap'), a rotation operation for multiple-of-90-degree rotations (item_type equal to 'irot'), and an image overlay operation (item_type equal to 'iovl'). The image overlay 'iovl' derived image locates one or more input images in a given layering order within a larger canvas.

The derived image feature of the Image File Format is extensible so that external specifications as well as later version of the Image File Format itself can specify new operations.

The following definitions may be used e.g. in the context of the MPEG-H Image File Format or similar file formats. A coded image may be defined as a coded representation of an image. A derived image may be defined as an image that is represented in a file by an indicated operation to indicated images and can be obtained by performing the indicated operation to the indicated images. An image may be defined as a coded image, a derived image, or one or more arrays of pixels of different colour components, depending on the context where the term image is used. An image collection may be defined as a set of images stored as items of a single file according to MPEG-H Image File Format (or alike). An auxiliary image may be defined as an image that may not be intended to be displayed but provides supplemental information, such as transparency data, complementing a respective primary image. A cover image may be defined as an image that is representative of an image collection or an image sequence and should be displayed when no other information is available on the preferred displaying method of the image collection or the image sequence. A pre-computed derived image may be defined as a coded image that has been derived from one or more other images. A primary image may be defined as an image that is stored as an item and is not an auxiliary image or a thumbnail image. A thumbnail image may be defined as a smaller-resolution representation of a primary image.

An image sequence may be defined as a sequence of images which may be associated with advisory timing and in which images may be inter predicted. In the MPEG-H Image File Format, image sequences are stored according to the track mechanism of the ISOBMFF. An image sequence track is used when there is coding dependency between images or when the playback of the images is timed. The timing in the image sequence track may be defined to be advisory for the players. In order to distinguish between image sequences and motion video, a new handler type 'pict' has been introduced in the MPEG-H Image File Format.

The MPEG-H Image File Format includes specifications to encapsulate (by inclusion and/or by reference) HEVC coded still images and image sequences into files conforming to the MPEG-H Image File Format. It is possible to specify encapsulation of images and image sequences coded with other coding formats into files conforming to the MPEG-H Image File Format.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially when the end system has limited resources, or the connection to the end system has limited bandwidth, it may be helpful to know from the content type alone if the content can be rendered.

RFC 6381 specifies two parameters, 'codecs' and 'profiles', that are used with various MIME types or type/subtype combinations to allow for unambiguous specification of the codecs employed by the media formats contained within, or the profile(s) of the overall container format.

By labeling content with the specific codecs indicated to render the contained media, receiving systems can determine if the codecs are supported by the end system, and if not, can take appropriate action (such as rejecting the content, sending notification of the situation, transcoding the content to a supported type, fetching and installing the required codecs, further inspection to determine if it will be sufficient to support a subset of the indicated codecs, etc.).

For file formats derived from the ISOBMFF, the codecs parameter specified in RFC 6381 may be considered to have the following structure according to the regular expression syntax described later: ListItem1 (, ListItemN)*.

Similarly, the profiles parameter specified in RFC 6381 can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean.

One of the original motivations for MIME is the ability to identify the specific media type of a message part. However, due to various factors, it is not always possible from looking at the MIME type and subtype to know which specific media formats are contained in the body part or which codecs are indicated in order to render the content.

There are several media type/subtypes (either currently registered or deployed with registration pending) that contain codecs chosen from a set. In the absence of the parameters described here, it is necessary to examine each media element in order to determine the codecs or other features required to render the content.

conforms to the Image File Format and has a derived image as its primary item. Consequently the codecs MIME parameter is not fully specified with the present draft ISO/IEC 23008-12. The file preferred_img.hevc is a preferred image (e.g. due to its smaller size compared to the respective JPEG image) that the web browser will download provided that the decoding of the image is supported. However, due to lack of the above-listed information, the web browser would be unable to conclude whether it can process preferred_img.hevc and would download the file fallback_img.jpg. Browsers that do not support images at all or none of the formats will download the fallback descriptive text indicated with the alt attribute.

```
<picture>
    <source type="image/mpeg-h; codecs=item.unspecified_at_the_moment"
src="preferred_img.hevc" />
    <img src="fallback_img.jpg" alt="Fallback descriptive text" />
</picture>
```

The Image File Format specifies two MIME types, one for images and image collections, and another one for image sequences. The format of the codecs parameter is specified for these MIME types. For example, each ListItem in the generic syntax of the codecs parameter according to RFC 6381 may be considered to be formatted as follows in the Image File Format: (trak.HandlerType|item).SampleEntry-Type.ProfileTierLevel (where | indicates an either- or relation). The codecs string includes an identifier 'trak' or 'item' to differentiate between tracks and items included in the file. To support differentiation between image sequence tracks and video tracks, the handler type HandlerType is included in the codecs string. For AVC- and HEVC-based codecs, the string including the sample entry type SampleEntryType (or equivalently item type) and the profile-tier-level information ProfileTierLevel is identical to that specified in ISO/IEC 14496-15.

For example, ProfileTierLevel is specified as follows for HEVC: the elements of ProfileTierLevel are a series of values e.g. from the HEVC decoder configuration record, separated by period characters ("."). In all numeric encodings, leading zeroes may be omitted. ProfileTierLevel comprises the following elements:

the general_profile_space, encoded as no character (general_profile_space=0), or 'A', 'B', 'C' for general_profile_space 1, 2, 3, followed by the general_profile_idc encoded as a decimal number;

the general_profile_compatibility_flags, encoded in hexadecimal (leading zeroes may be omitted);

the general_tier_flag, encoded as 'L' (general_tier_flag=0) or 'H' (general_tier_flag=1), followed by the general_level_idc, encoded as a decimal number;

each of the 6 bytes of the constraint flags, starting from the byte containing the general_progressive_source_flag, each encoded as a hexadecimal number, and the encoding of each byte separated by a period; trailing bytes that are zero may be omitted.

However, the specification of the codecs parameter for the Image File Format lacks the consideration for derived images.

This may lead to various problems, and some of them are illustrated herein with an example of the following piece of HTML 5.1 code. There are two coded representations of the same image, the first file preferred_image.hevc and the second file fallback_img.jpg. The file preferred_image.hevc When an image player (e.g. in a browser) intends to play a representation of a derived image, it needs to compose the derived image from the original image(s) using the operations documented in the representation of the derived image. The player may need to assess if it is capable of composing the derived image before performing the operations themselves, because otherwise the player may fail in composing the derived image and merely waste time (in downloading and processing) and computing resources. The assessment whether the player has all the needed resources to compose a derived image may include one or more of the following challenges:

The player needs to assess whether it is capable of performing all types of operations that are used in the derived image representation.

The player needs to assess whether it can decode the coded images used as input image for the construction of the derived image. This may involve:

Determining if the codec (e.g. HEVC) and the coding profile (e.g. the Main profile) is supported. Also optionally whether the tier and the level of the input images is supported.

Assessing whether the player has the memory resources available needed to perform the operations.

Consequently, there is a need for a simplified method for assessing whether the player is capable of composing the derived image.

Now in order to at least alleviate the above problems, a method for assessing the capability to compose the derived image is presented hereinafter.

In the assessing method, which is disclosed in FIG. 6, the player receives (600) a first description of a first file, the first description including properties of at least a derived image included in or referred to by the first file. The player determines (602), based on the properties of the derived image, whether to obtain the derived image, and in response to determining to obtain the derived image, obtains (604) the first file comprising the derived image.

According to an embodiment, the player may further receive (606) a second description of a second file that comprises representation of a corresponding image content as that represented by the derived image; and determine (608), based on the properties of the derived image and the second description, whether to obtain the first file or the second file. Then the player obtains either the first file or the second file (610).

Thus, the player may determine whether the reconstruction of the derived image is possible. Hence, the indicated properties can be used to avoid unnecessary downloading of the file, if the derived image in the file cannot be reconstructed by the player of a receiver, web browser, or such. According to an embodiment, there may be a plurality of alternative image files with the same content available, and the player may choose which image file of said alternatives is downloaded and reconstructed based on the descriptions.

According to an embodiment, the first description comprises a MIME type.

According to an embodiment, the first description, such as the MIME type, comprises one or more of the following pieces of information for at least one derived image:

a first identification of an instruction set used for the at least one derived image, which may for example comprise a list of identifications of instruction sets, such as a first optional MIME parameter comprising a list of URIs specifying an instruction set used in the derived images of the file, and an index specific to the at least one derived image, the index pointing to a list element of the list of identifications of instructions;

a second identification of the codecs and codec profiles of coded input images for the at least one derived image, wherein said identification may be contained in a second optional MIME parameter, which may e.g. be named the codecs parameter;

a resource count indicative of resources needed for the construction of the at least one derived image, such as a cumulative number of pixels that are required for input and output images of any single image operation used to construct the at least one derived image.

An instruction set for a derived image may be defined as a set of derived image types or a set of image operation types. A particular instruction set may be considered to be used for a derived image, when the derived image can be constructed using the operations defined by the instruction set.

The first optional MIME parameter may be referred to as, for example, dimg-instr-set, and it may define one or more instruction set(s) used for the particular derived image and any derived image used directly or indirectly as input for the particular derived image. For example, the image operations specified in ISO/IEC 23008-12 (clean aperture, rotation, and overlay) can be considered an instruction set.

The codecs MIME parameter may define the codec (e.g. HEVC) and profile (e.g. the Main profile) used for the coded images that are used directly or indirectly as input for the particular derived image. Tier and level may also be included but not absolutely necessary, because generally there are no real-time processing requirements involved in decoding of individual images.

The cumulative number of pixels (in the largest sample array) may be used to characterize the memory resources needed for an image (while other factors, such as bit depth and chroma format, may be concluded from the codec profiles and the derived image instruction set). As several input images may be needed for the particular derived image or any of direct or indirect input images, a cumulative pixel count of images is provided. This helps in ensuring that all the intermediate images used directly or indirectly as input for the particular derived image can be kept within the memory limits of the player.

Next, various embodiments relating to the implementation of the MIME type are disclosed, wherein the regular expression syntax is used, where keywords in italics are considered variables that are resolved by replacing them with their values, ( ) indicates a string of one or more characters, * indicates the inclusion of the string enclosed within the preceding parentheses by 0 or more times,? indicates the inclusion of the string enclosed within the preceding parentheses by 0 or 1 times, and alphanumeric characters are included as such. It needs to be understood that similar embodiments can be formed using other syntax rules than the regular expression syntax and/or other variations of the syntax for indicating one or more of the first identification, the second identification, and the resource count for the at least one derived image.

The codecs parameter for files conforming to the Image File Format has the following structure:

ListItem1 (, ListItemN)* where each ListItem is proposed to have the following structure, when SampleEntryType indicates a coding format:

(trak.HandlerType|item).SampleEntryType.ProfileTierLevel

According to an embodiment, the following additional specifications for the MIME type of files/resources conforming to the Image File Format are made:

The dimg-instr-set optional MIME parameter is specified to contain:

<uri1>(<uriN>)* where each uriN is a URI, and each uriN is enclosed in angle brackets. If dimg-instr-set is not present but is referred to by the codecs parameter, dimg-instr-set is inferred to consist of uri1 only with a pre-defined default value, such as the value urn:mpeg:isoiff:2015, which may e.g. refer to the instruction set or item types of derived images specified in the Image File Format.

For example, the URI urn:mpeg:isoiff:2015 may be specified to indicate a derived image instruction set consisting of the clean aperture, rotation, and overlay operations. In another example, the URI urn:mpeg:isoiff:2015:baseline may be specified to indicate a derived image instruction set consisting of the clean aperture and rotation derived images, and the URI urn:mpeg:isoiff:2015:extended may be specified to indicate a derived image instruction set consisting of the clean aperture, rotation, and overlay derived images.

According to an embodiment, the following specifications for the ListItem in the codecs parameter syntax of the MIME type of the Image File Format are made: For derived images, SampleEntryType equal to dimg is used in the syntax of the ListItem and ListItem has the following structure:

dimg(.InstrIdx(.PixelCount.CodecInfo)?)?

where

InstIdx indicates an index L of the URI uriL identifying the instruction set used for the derived image. If InstIdx is not present, InstIdx is inferred to be equal to 1;

PixelCount is a positive decimal integer indicating the greatest number of pixels that are required for input and output images of any single image operation used to construct the derived image;

CodecInfo has the following structure: NumCodedImg. (ItemType.ProfileTierLevel)*, where NumCodedImg is a positive integer of the coded input images that may have differing values of ItemType.ProfileTierLevel pairs, and the number of pairs ItemType.ProfileTierLevel is equal to NumCodedImg. ItemType is the four-character item type of a coded image as input for the derived image, and ProfileTierLevel is the profile-level information as specified for the codecs parameter of the ISO Base Media File Format name space in RFC 6381. For AVC- and HEVC-based codecs, the format of ProfileTierLevel is specified in ISO/IEC 14496-15.

CodecInfo is chosen to be the last part of the ListItem so that it can be truncated from the end. For example, most times the full HEVC ProfileTierLevel string contains trailing zeros that need not be included.

Examples of the syntax of the embodiment include the following:

Content-Type: image/mpeg-h; codecs=item.dimg
An image file where the primary item of the file is a derived image using the instruction set specified in the Image File Format.

Content-Type: image/mpeg-h; codecs=item.dimg.1.2995200.hvc1.A1.80.L93.B0
An image file where the primary item of the file is a derived image using the instruction set specified in the Image File Format and requiring the storage of up to two images, one with size 1920×1080 and another with size 1280×720, and requires the decoding of one progressive, non-frame-packed HEVC Main profile image at Main tier, level 3.1.

According to an embodiment, the following specifications for the ListItem in the codecs parameter syntax of the MIME type of the Image File Format are made: For derived images, SampleEntryType equal to dimg shall be used in the syntax of the ListItem and ListItem has the following structure:

dimg(.InstrIdx(.WidthHeight(.CodecInfo)?)?)?

where

InstrIdx indicates an index L of the URI uriL identifying the instruction set used for the derived image. If InstIdx is not present, InstIdx is inferred to be equal to 1;

WidthHeight has the following structure: NumImg.(WidthImgN.HeightImgN)*, where NumImg is a positive decimal integer indicating the number of images that are required for a single image operation requiring the greatest amount of memory, and the number of pairs WidthImgN..HeightImgN is equal to NumImg. WidthImgN and HeightImgN are positive decimal integers indicating the width and height, respectively, of the decoded or derived image required for that particular single image operation;

CodecInfo has the following structure: NumCodedImg.(ItemType.ProfileTierLevel)*, where NumCodedImg is a positive integer of the coded input images that may have differing values of ItemType.ProfileTierLevel pairs, and the number of pairs ItemType.ProfileTierLevel is equal to NumCodedImg. ItemType is the four-character item type of a coded image as input for the derived image, and ProfileTierLevel is the profile-level information as specified for the codecs parameter of the ISO Base Media File Format name space in RFC 6381. For AVC- and HEVC-based codecs, the format of ProfileTierLevel is specified in ISO/IEC 14496-15.

Some of the above embodiments may be further illustrated by an example of an image file selection in HTML 5.1, where the following syntax is used:

```
<picture>
  <source type="image/mpeg-h; codecs=item. dimg.1.1843200.hvc1.A1.80.L93.B0" src="preferred_img.hevc" />
  <img src="fallback_img.jpg" alt="Fallback descriptive text" />
</picture>
```

In this example, there are two coded representations of the same image, the first file preferred_image.hevc and the second file fallback_img.jpg. The file preferred_image.hevc conforms to the Image File Format and has a derived image as its primary item. The instruction set specified in the Image File Format is required for constructing the derived image. The cumulative pixel count required to construct the derived is 2*1280*720, which could indicate e.g. that a decoded image of 1280×720 pixels is rotated to form the derived image. Moreover, the derived image requires the decoding of one progressive, non-frame-packed HEVC Main profile image at Main tier, level 3.1. The web browser will download preferred_img.hevc provided that it has the capabilities and resources for constructing the described derived image. Otherwise, the web browser will download the file fallback_img.jpg or the fallback descriptive text, as described earlier.

A media content description may be defined as a term for any description of media content, including but not limited to MIME type (potentially including optional parameters of the MIME type); an HTML page or alike including elements describing the embedded media content, such as the picture element of HTML 5.1 as described above; a manifest of streaming content, such as MPD of MPEG-DASH or extended M3U format of HLS as described earlier; and a description according to the session description protocol (SDP), which may be used for establishing RTP sessions, for example.

Figure 7:
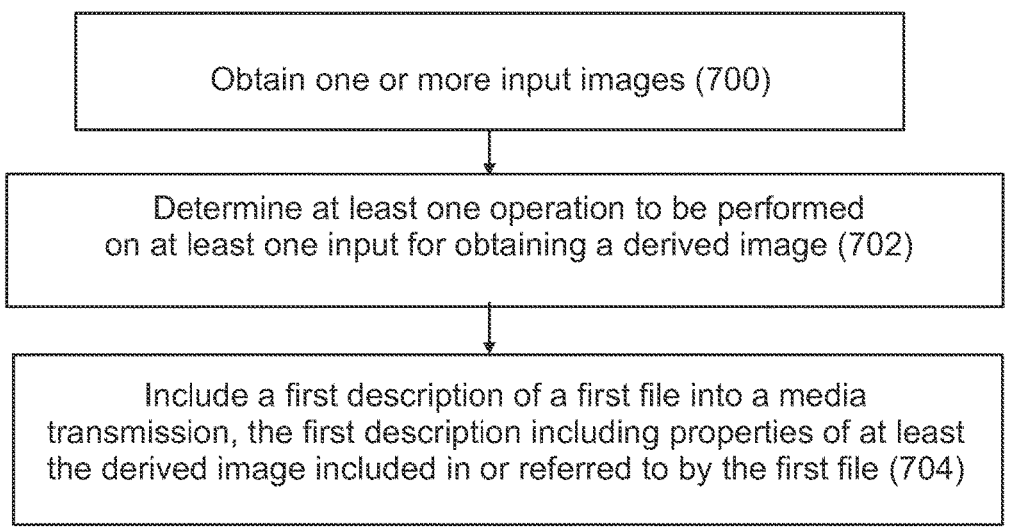
FIG. 7 shows a flow chart of operation of a file creator according to an embodiment of the invention.

The operation of a file creator is illustrated in FIG. 7. Therein, the file creator obtains (700) one or more input images and determines (702) at least one operation to be performed on at least one input for obtaining a derived image. The file creator includes (704) a first description of a first file into a media content description, the first description including properties of at least the derived image included in or referred to by the first file.

Similarly, the file creator may also include a second description of a second file that comprises representation of a corresponding image content as that represented by the derived image.

In some above-described embodiments, examples have been given on the resource counts indicative of resources needed for the construction of a derived image. However, according to an embodiment, any resource count (e.g. PixelCount as specified above or WidthHeight as specified above) may be replaced by or additionally be complemented by other type(s) of resource counts. Example embodiments on resource counts are provided below with relation to a file creator and the resource counts being indicated within a file; however, it needs to be understood that the embodiments can be described similarly with relation to other entities, such as a content provider and/or indicating the resource counts with a description of a file rather than or in addition to the indicating them within the file.

According to an embodiment, in addition to or instead of including properties of a derived image in a description of an image file, an image file creator may includes, into an image file, a data structure that represents a derived picture; and includes, into the image file, at least one value indicative of the needed resources of composing the derived picture.

In an embodiment, a MIME type with optional parameters indicative of the needed resources of composing at least one derived image in the file is included in the type. Examples of optional MIME parameters for indicating the needed resources have been described earlier with other embodiments. For example, a file level box may be used to convey a MIME type string. In another example, a track ('trak' box) and/or item metadata may be appended with their respective parts of the MIME type. A ListItem of the codecs parameter may be included in a box within the 'trak' box hierarchy. A ListItem of the codecs parameter may be included for one or more items within a 'meta' box, e.g. by appending the Item Information box or introducing a new box.

The values indicative of the needed resources can include but is not limited to one or more of the following:

A value greater than or equal to a maximum pixel, sample and/or byte count needed at any stage of composing the derived picture.

A value greater than or equal to a maximum pixel, sample and/or byte count needed for any picture needed to compose the derived picture, wherein the pictures needed to compose the derived picture include output pictures of intermediate operations for composing the derived picture.

An identifier for identifying the set of operation types that may be used in composing the derived picture, whereas operation types not included in the set of operation types are not used in composing the derived picture.

According to an embodiment, a file creator may operate using one or more steps below:

The file creator indicates the order of the image operations to compose a derived image in the file.

For each image operation (to compose the derived image), the file creator determines which input pictures and which intermediate pictures (resulting from earlier image operations) are required for this image operation or any subsequent image operation. The file creator determines a cumulative resource count of certain resource type needed to store or keep these required pictures in the memory. The resource type may be for example number of pixels, number of samples, or number of bytes.

The file creator selects the maximum of the cumulative resource counts of all image operations (to compose a derived image). A value equal to or greater than the maximum may is included in the file as an indicative value of needed resources to compose the derived image According to an embodiment, a file creator may operate using one or more steps below:

The image operations Operation[i] (for each value of i in the range of 0 to the number of image operations, NumOperations, minus−1, inclusive) are ordered by the file creator in a nominal processing order, such that image operations Operation[i] can be processed in the ascending order of i, and Operation[j] shall not depend on any operation Operation[i] such that i>j. The file creator indicates the order of the image operations in the file, e.g. by including the image operations Operation[i] in ascending order of i in the data structure of a derived image. It is noted that it may be possible to process image operations in other than the nominal processing order, but the resource counts are derived using the nominal order.

Let an input image InputImage[j] be the input images "externally" provided to the image operations (i.e., not created by the image operations) for all values of j in the range of 0 to the number of input images NumInputImages minus 1, inclusive.

Let an intermediate image IntermediateImage[i][j] be the output of the image operation Operation[i] for all values of j in the range of 0 to the number of output images NumOperOutputImages[i] of the output operation Operation[i] minus 1, inclusive.

A resource count IntermediateImageResourceCount[i][j] may be derived separately for each intermedia image IntermediateImage[i][j] for each value of i in the range of 0 to NumOperations−1, inclusive for all values of j in the range of 0 to the number of output images NumOperOutputImages[i]−1, inclusive.

Similarly, a resource count InputImageResourceCount[j] may be derived for each value of j in the range of 0 to NumInputImages−1, inclusive Let an active picture set ActiveSet[i] of images consist of the following images:

The input images InputImage[m] for any value of m in the range of 0 to NumInputImages−1, inclusive, such that InputImage[m] is used as an input to any image operation Operation[k] for any value of k in the range of i to NumOperations−1, inclusive.

The intermediate images IntermediateImage[m][n] for any value of m in the range of 0 to i−1, inclusive, and for any value of n in the range of 0 to NumOperOutputImages[m]−1, inclusive, such that IntermediateImage[m][n] is used as an input to any image operation Operation[k] for any value of k in the range of i to NumOperations−1, inclusive.

The intermediate images IntermediateImage[i][j] for any value of n in the range of 0 to NumOperOutputImages[i]−1, inclusive.

A resource count ActiveSetResourceCount[i] may be derived for each active picture set ActiveSet[i] for i in the range of 0 to NumOperations−1, inclusive, as a sum of the resource counts of the pictures in the active picture set ActiveSet[i].

A maximum cumulative resource count MaxCumulativeResourceCount may be set equal to the greatest value of ActiveSetResourceCount[i] for i in the range of 0 to NumOperations−1, inclusive.

According to an embodiment, a maximum individual resource count MaxResourceCount may be set equal to the greatest value of InputImageResourceCount[k] for any value of k in the range of 0 to NumInputImages−1, inclusive, or IntermediateImageResourceCount[i][j] for any value of i in the range of 0 to NumOperations−1, inclusive, and for any value of j in the range of 0 to the number of output images NumOperOutputImages[i]−1, inclusive. In an alternative embodiment, a maximum individual resource count MaxResourceCount may be set equal to the greatest value of IntermediateImageResourceCount[i][j] for any value of i in the range of 0 to NumOperations−1, inclusive, and for any value of j in the range of 0 to the number of output images NumOperOutputImages[i]−1, inclusive.

According to an embodiment, the file creator may set at least one of a first value indicative of the needed resources to be greater than or equal to MaxCumulativeResourceCount.

a second value indicative of the needed resources to be greater than or equal to MaxResourceCount.

There may be one or more types of resource types for which the value indicative of the needed resources may be provided. Some non-limiting examples of deriving a resource count ResourceCount for different resource types are given below, where the ResourceCount may be derived from a single image (and therefore could effectively be one of the InputImageResourceCount[ ] or IntermediateImageResourceCount[ ][ ]) or from a set of images (and therefore could effectively be ActiveSetResourceCount[ ]).

- The number of pixels, i.e. the number of samples in the sample array of the highest sample count among all the sample arrays of an image or a set of images.
- The number of samples, i.e. the number of samples in all the sample arrays of an image or a set of images.
- The number of memory units, such as the number of bytes, needed for storing an image or a set of images. The number of memory units may be indicated relative to a sample array arrangement, which may be pre-defined or indicated along the value of the needed memory units in the file. The sample array arrangement may be but is not limited to one of the following:
  - Samples are stored in distinct bytes. If the bit depth of a sample is not a multiple of 8, a sample is assumed to occupy the next higher integer number of bytes. For example, if the bit depth of a sample is 10, a sample is assumed to occupy 2 bytes. It is noted that the bit depth of different color components may differ. For example, the luma component may have a bit depth of 10 bits, while the chroma components may have a bit depth of 8 bits.
  - Collocated samples of different color components are packed to an integer number of bytes. For example, if the bit depth of samples is 10 and the chroma format is 4:4:4, each set of collocated Y, U and V samples is assumed to allocate 30 bits packed into 4 bytes.

According to an embodiment, the file creator may set at least one of

- a first set of values indicative of the needed resources to be greater than or equal to MaxCumulativeResourceCount, where each element in the set corresponds to a different resource type. The element types may be pre-defined for example in a file format standard or may be indicated in the file.
- a second value indicative of the needed resources to be greater than or equal to MaxResourceCount, where each element in the set corresponds to a different resource type. The element types may be pre-defined for example in a file format standard or may be indicated in the file.

Example embodiments on resource counts are provided below with relation to a file player and the resource counts being parsed from a file; however, it needs to be understood that the embodiments can be described similarly with relation to other entities, such as a web browser and/or parsing the resource counts from a description of a file.

According to an embodiment, in addition to or instead of parsing properties of a derived image from a description of an image file, an image file player parses, from an image file, at least one value indicative of the needed resources of composing a derived picture; and determines based on at least one value, if it can compose the derived picture.

According to an embodiment, the file player may perform one or more of the following steps:

- The file player parses, from a file, at least one value indicative of needed resources to compose a derived image.
- The file player determines on the basis of the at least one value whether it is capable of composing the derived image.
- If the file player determined that it is capable of composing the derived image, the file player parses, from the file, a data structure that represents the derived image, the data structure defining an directed acyclic graph of at least one operation; and the file player composes the derived by performing the directed acyclic graph of at least one operation.

Additionally, the file player may perform the following steps:

- The file player parses, from the file, an execution order of the image operations to compose the derived image.
- When performing the image operations in execution order image operation by image operation, for each image operation:
  - The file player determines, on the basis of the inputs and outputs of the at least one operation and the execution order, which pictures are required for subsequent operations in the execution order.
  - The file player frees the resources to store the pictures (e.g., deallocates memory to store the pictures) which are no longer needed in subsequent operations in the execution order.

In addition to the above embodiments, complementing embodiments may be performed, such embodiments relating to in-place image operations. According to an embodiment, in-place image operations may be taken into account in the resource counts. An in-place image operation may be defined as such an image operation where the same memory can be used for the input image(s) of the operation and the output image(s) of the operation. It may be considered that in an in-place image operation a non-overlapping input window, such as a pixel or a block of pixels, of one or more input images is processed to produce the output of the respective window of the one or more output images. Hence, as soon as the pixels of a certain output window have been produced (in a working memory), the respective pixels in the input window can be replaced by those of the output window. The pixels that were written over by the pixels of the output window do not affect the processing of subsequent windows in the processing order. For example, a tone mapping image operation could be an in-place image operation.

A set of pre-defined in-place image operations may be defined for example in a file format standard.

Alternatively or additionally, the file creator may indicate in the file if an image operation is considered to be an in-place image operation.

When deriving resource counts, the file creator may treat an in-place image operation in a manner that the derivation of the resource count only considers a single image to represent an input image and the respective output image of the image operation. More generally, if the image operation has multiple inputs and outputs, the file creator may treat an in-place image operation in a manner that the derivation of the resource count only considers a single image to represent each pair of an input image and the respective output image. In some embodiments, the file creator treats an image operation as an in-place image operation only if the input images of the image operation are not used as input image to any subsequent image operation in the execution order.

When an image operation is indicated (in the file) or pre-defined to be an in-place image operation, the file player may accordingly perform the image operation as an in-place operation. In some embodiments, the file player treats an image operation as an in-place image operation only if the input images of the image operation are not used as input image to any subsequent image operation in the execution order.

Figure 8:
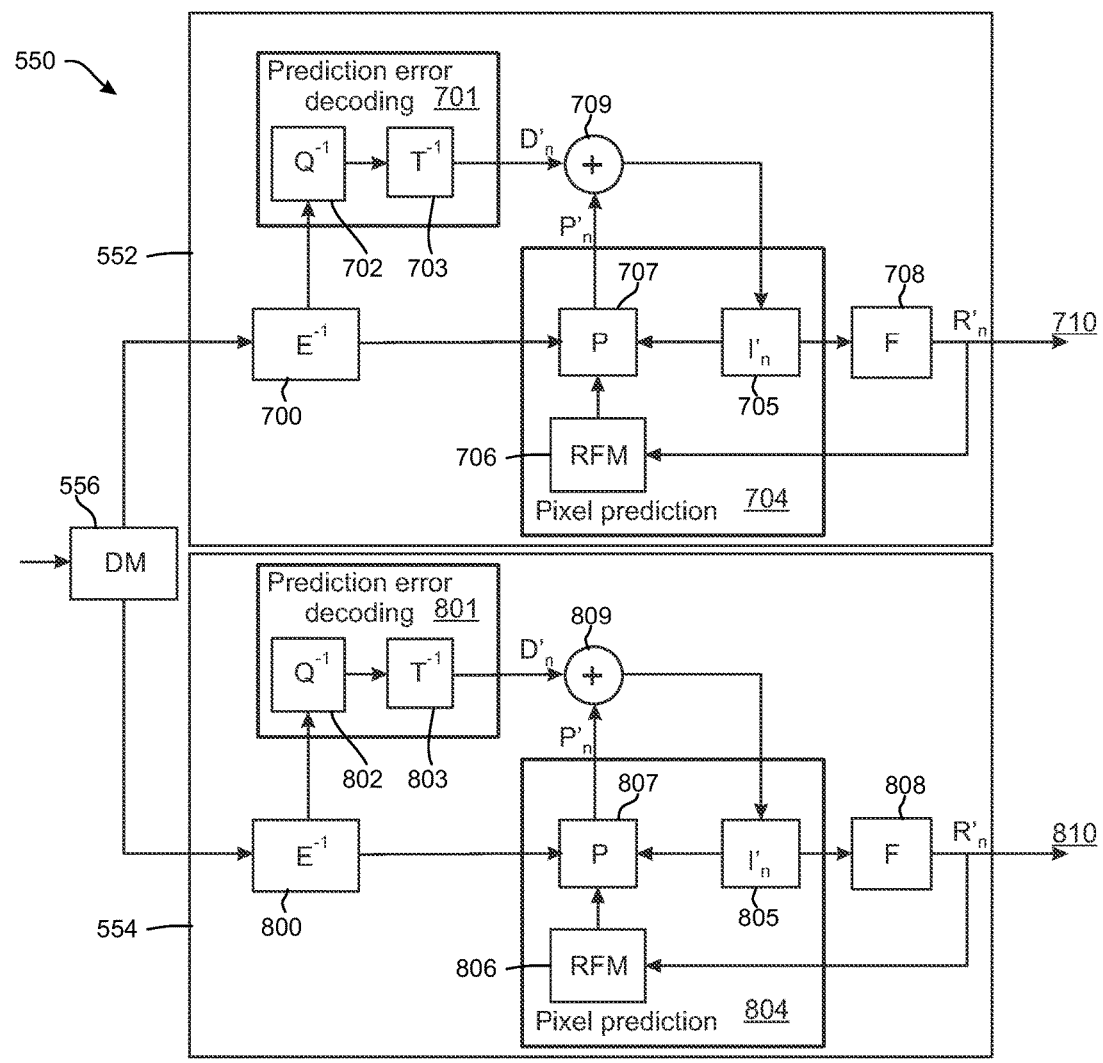
FIG. 8 shows a schematic diagram of a decoder suitable for implementing embodiments of the invention.

FIG. 8 shows a block diagram of a video decoder suitable for employing embodiments of the invention. FIG. 8 depicts a structure of a two-layer decoder, but it would be appreciated that the decoding operations may similarly be employed in a single-layer decoder.

The video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base view/non-base view components to obtain the preliminary reconstructed images (I'n). Preliminary reconstructed and filtered base view images may be output 709 from the first decoder section 552 and preliminary reconstructed and filtered base view images may be output 809 from the first decoder section 554.

Herein, the decoder should be interpreted to cover any operational unit capable to carry out the decoding operations, such as a player, a receiver, a gateway, a demultiplexer and/or a decoder.

In the above, some embodiments have been described in relation to MIME types and optional MIME parameters. It needs to be understood that rather than or in addition to the optional MIME parameters, other signaling may be used, such as attributes e.g. within an XML description, such as MPD of MPEG-DASH, or other media content descriptions.

In the above, some embodiments have been described in relation to ISOBMFF. It needs to be understood that embodiments could be similarly realized with any other file format, such as Matroska, with similar capability and/or structures as those in ISOBMFF.

In the above, some embodiments have been described in relation to a player. It needs to be understood that other terms could be interchangeably used, such as reader, parser, user agent, or client. It needs to be understood that a player can but needs not be a standalone application. A player can be embedded for example in a web browser.

In the above, some embodiments have been described in relation to a player. It needs to be understood that embodiments could be similarly realized when images or image files are not played or displayed, but retrieved for other purposes. In an embodiment, a proxy cache receives a first description of a first file, the first description including properties of at least a derived image included in or referred to by the first file. The proxy cache determines, based on the properties of the derived image, and knowledge on capabilities of one or more clients whether to obtain the derived image, and in response to determining to obtain the derived image, obtains the first file comprising the derived image. According to an embodiment, the proxy cache may further receive a second description of a second file that comprises representation of a corresponding image content as that represented by the derived image; and determine, based on the properties of the derived image and the second description and knowledge on capabilities of one or more clients, whether to obtain the first file or the second file. Then the player obtains either the first file or the second file.

In the above, some embodiments have been described in relation to a file creator. It needs to be understood that other terms could be interchangeably used, such as writer, file generator, or content provider. It needs to be understood that a creator can but needs not be a standalone application. A creator can be embedded for example in a web server, e.g. using scripts.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
receiving a first description of a first file, the first description including properties of a derived image included in the first file, wherein the derived image is an image that is represented by at least one operation to at least one coded input image, wherein the first description including properties of the derived image comprises one or more of the following pieces of information for the derived image: a first identification of an instruction set specifying the at least one operation used for the derived image; a second identification of codecs and codec profiles of the at least one coded input image for the derived image; or a resource count indicative of resources needed for the construction of the derived image;
determining, based on the first description including properties of the derived image, whether to obtain the derived image; and
in response to determining to obtain the derived image, obtaining the first file comprising the derived image.

2. The method according to claim 1, wherein the first description comprises a Multipurpose Internet Mail Extension (MIME) type.

3. The method according to claim 1, further comprising:
parsing, from the first file, at least one value indicative of the needed resources of composing a derived image; and
determining, based on at least one value, if the derived image can be composed.

4. An apparatus comprising:
at least one processor and at least one memory, said at least one memory stored with code thereon, which when executed by said at least one processor, causes the apparatus to perform at least:
receiving a first description of a first file, the first description including properties of a derived image included in the first file, wherein the derived image is an image that is represented by at least one operation to at least one coded input image, wherein the first description including properties of the derived image comprises one or more of the following pieces of information for the derived image: a first identification of an instruction set specifying the at least one operation used for the derived image; a second identification of codecs and codec profiles of the at least one coded input image for the derived image; or a resource count indicative of resources needed for the construction of the derived image;
determining, based on the first description including properties of the derived image, whether to obtain the derived image; and
in response to determining to obtain the derived image, obtaining the first file comprising the derived image.

5. The apparatus according to claim 4, wherein the first description comprises a Multipurpose Internet Mail Extension (MIME) type.

6. A computer readable storage medium stored with code thereon for use by an apparatus, which when executed by a processor, causes the apparatus to perform:
receiving a first description of a first file, the first description including properties of a derived image included in the first file, wherein the derived image is an image that is represented by at least one operation to at least one coded input image, wherein the first description including properties of the derived image comprises one or more of the following pieces of information for the derived image: a first identification of an instruction set specifying the at least one operation used for the derived image; a second identification of codecs and codec profiles of the at least one coded input image for the derived image; or a resource count indicative of resources needed for the construction of the derived image;
determining, based on the first description including properties of the derived image, whether to obtain the derived image; and
in response to determining to obtain the derived image, obtaining the first file comprising the derived image.

7. A method comprising:
obtaining one or more coded input images;
determining at least one operation to be performed on at least one coded input image for obtaining a derived image; and
including a first description of a first file into a media content description, the first description including properties of at least the derived image included in the first file, wherein the derived image is an image that is represented by the at least one operation to the at least one coded input image, wherein the first description including properties of the derived image comprises one or more of the following pieces of information for the derived image: a first identification of an instruction set specifying the at least one operation used for the derived image; a second identification of codecs and codec profiles of the at least one coded input image for the derived image; or a resource count indicative of resources needed for the construction of the derived image.

8. The method according to claim 7, wherein the first description comprises a Multipurpose Internet Mail Extension (MIME) type.

9. The method according to claim 7, further comprising:
including, into the first file, a data structure that represents a derived image; and
including, into the first file, at least one value indicative of the needed resources of composing a derived image.

10. The method according to claim 9, wherein the values indicative of the needed resources includes one or more of the following:
a value greater than or equal to a maximum pixel, sample and/or byte count needed at any stage of composing the derived image;
a value greater than or equal to a maximum pixel, sample and/or byte count needed for any picture needed to compose the derived image, wherein the pictures needed to compose the derived image include output pictures of intermediate operations for composing the derived image; or
an identifier for identifying the set of operation types that may be used in composing the derived image, whereas operation types not included in the set of operation types are not used in composing the derived image.

11. An apparatus comprising
at least one processor and at least one memory, said at least one memory stored with code thereon, which when executed by said at least one processor, causes the apparatus to perform at least:
obtaining one or more coded input images;
determining at least one operation to be performed on at least one coded input image for obtaining a derived image; and
including a first description of a first file into a media content description, the first description including properties of at least the derived image included in the first file, wherein the derived image is an image that is represented by the at least one operation to the at least one coded input image, wherein the first description including properties of the derived image comprises one or more of the following pieces of information for the derived image: a first identification of an instruction set specifying the at least one operation used for the derived image; a second identification of codecs and codec profiles of the at least one coded input image for the derived image; or a resource count indicative of resources needed for the construction of the derived image.

12. The apparatus according to claim 11, wherein the first description, comprises a Multipurpose Internet Mail Extension (MIME) type.

13. A computer readable storage medium stored with code thereon for use by an apparatus, which when executed by a processor, causes the apparatus to perform:
obtaining one or more coded input images;
determining at least one operation to be performed on at least one coded input image for obtaining a derived image; and
including a first description of a first file into a media content description, the first description including properties of at least the derived image included in the first file, wherein the derived image is an image that is represented by the at least one operation to the at least one coded input image, wherein the first description including properties of the derived image comprises one or more of the following pieces of information for the derived image: a first identification of an instruction set specifying the at least one operation used for the derived image; a second identification of codecs and codec profiles of the at least one coded input image for the derived image; or a resource count indicative of resources needed for the construction of the derived image.

* * * * *